United States Patent [19]

Ippendorf

[11] Patent Number: 5,182,017
[45] Date of Patent: Jan. 26, 1993

[54] FILTRATE SEPARATING DEVICE WITH FLEXIBLE DEFORMABLE LIQUID AND GAS IMPERMEABLE WALL

[76] Inventor: Ralph Ippendorf, von Pylsum Weg 12, 5600 Wuppertal, Fed. Rep. of Germany

[21] Appl. No.: 731,092

[22] Filed: Jul. 17, 1991

[30] Foreign Application Priority Data

Jul. 19, 1990 [DE] Fed. Rep. of Germany ....... 4022960

[51] Int. Cl.⁵ .............................................. B01D 25/12
[52] U.S. Cl. .................................... 210/225; 210/227; 210/442; 210/445; 210/455; 92/78
[58] Field of Search ............... 210/224, 225, 226, 227, 210/445, 541, 442, 455, 483; 92/78

[56] References Cited

U.S. PATENT DOCUMENTS

| | | |
|---|---|---|
| 3,007,416 | 11/1961 | Childs ........................................ 92/78 |
| 3,194,170 | 7/1965 | Ulbing ........................................ 92/78 |
| 3,899,426 | 8/1975 | Hirs . |
| 4,172,790 | 10/1979 | Kubo .................................... 210/224 |
| 4,826,607 | 5/1989 | Pearce .................................. 210/225 |
| 5,094,760 | 3/1992 | Bratten ................................ 210/225 |

FOREIGN PATENT DOCUMENTS 3411087 9/1985 Fed. Rep. of Germany .
3902200 8/1990 Fed. Rep. of Germany .

*Primary Examiner*—Robert A. Dawson
*Assistant Examiner*—W. L. Millard
*Attorney, Agent, or Firm*—Sixbey, Friedman, Leedom & Ferguson

[57] ABSTRACT

Filtrate separating device having a pair of walls connected by a frame defining a receiving space for sludge to be filtered. The walls being displaceable away from one another, and made of a flexibly deformable liquid and gas impermeable material.

20 Claims, 5 Drawing Sheets

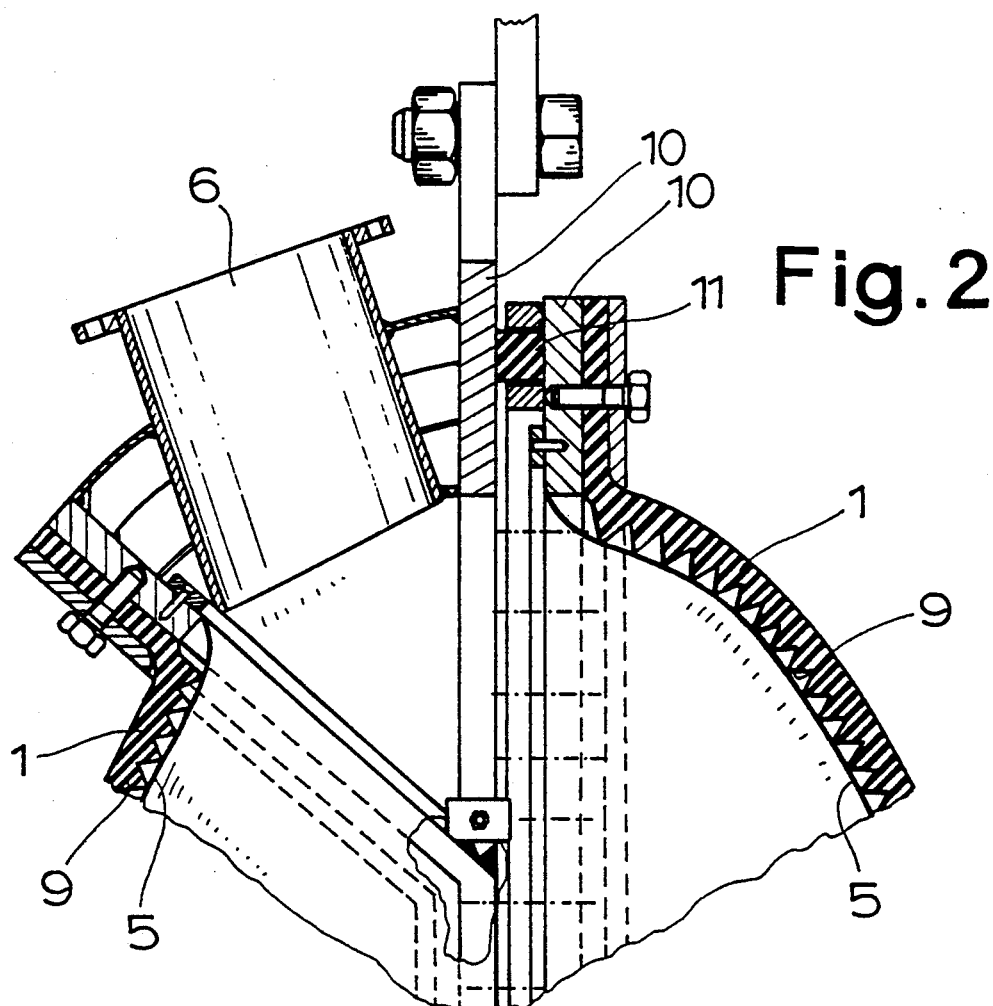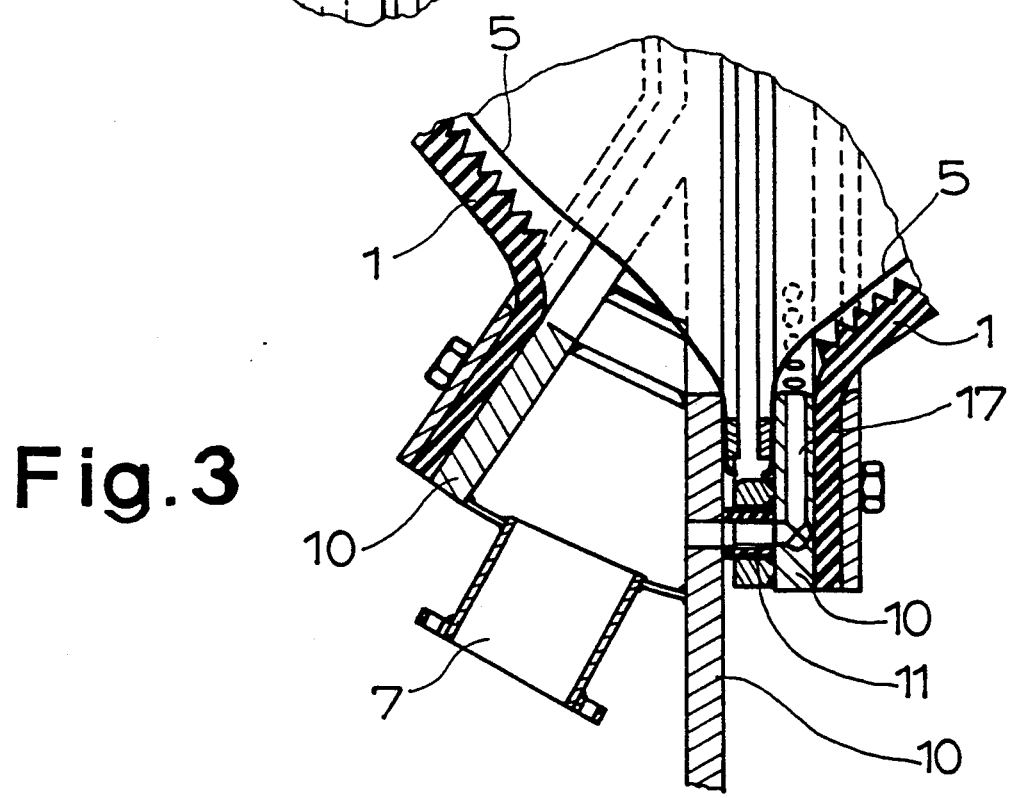

FILTRATE SEPARATING DEVICE WITH FLEXIBLE DEFORMABLE LIQUID AND GAS IMPERMEABLE WALL

BACKGROUND OF THE INVENTION

The invention relates to a filtrate separating device, especially for sewage sludge disposal, with a receiving space for sludge to be filtered, a frame connecting a pair of walls defining the receiving space, at least one filter mat, placed on a wall in the receiving space for solid/liquid separation, a sludge intake connected to the receiving space and a filtrate drain connected to the space between each wall and filter mat; wherein, for the removal of the dry filter cake, freed from filtrate, the walls are moved away from one another and the frame is opened.

Filtrate separating devices of the type under discussion are an indispensable means, especially in the field of sewage sludge disposal, for disposing of sewage sludge economically. In such a filtrate separating device, the liquid filtrate is pressed out of the sewage sludge so that, finally, to the greatest extent possible, only a dry filter cake remains which can either be disposed of or processed further, especially burned. Problems similar to those occurring in sewage sludge disposal also occur in other fields. For example, such problems arise in the field of paint sludge disposal from paint shops, in the food industry, and for garbage compaction with or without liquid accumulation.

The known filtrate separating devices consist of a plurality of plates placed vertically and lined up successively, whose front and back surfaces form the walls of receiving spaces, formed between the plates, for the sludge to be filtered. An central intake opening running through the plates forms the sludge intake to the receiving spaces. The receiving spaces between the individual plates are sealed relative to the outside by a frame. The walls have a plurality of duct-like moldings, which are brought together in a filtrate drain placed at the lower end of each wall. Each wall provided with ducts is covered with a flexible filter mat, which is fastened to the frame. All of the plates are connected to one another by standards running in the longitudinal direction. With the usual size of the plates being about 2 to 4 square meters, such a device with a total of 40 plates weighs about 25 tons.

In operation, the plates are moved together by a hydraulic press and occupy a firmly preset space, by which the receiving spaces between the plates are defined. Then, the sewage sludge (or another medium to be filtered) is introduced into the receiving spaces by the sludge intake under high pressure. The sewage sludge is pressed out by the filling pressure of the sewage sludge. The filtrate from each receiving space can drain into the filtrate drain by the duct structure of the surfaces of the plates. If it turns out that the receiving spaces become clogged, the filtering process is ended. The plates are moved away from one another and the now largely dry filter cakes are removed from the various receiving spaces.

The description given above of the prior art makes it clear that filtrate separating devices of the usual design can be used only in large frames and require a complex design and costly expenditure. The problem of the known filtrate separating device is, thus, that it is too complicated, too bulky and requires too much plant engineering as well as being too expensive.

SUMMARY OF THE INVENTION

The object of the invention is to solve the above-indicated problem, i.e., to provide a filtrate separating device, which does not exhibit the above-discussed drawbacks.

The above-indicated object is achieved, in accordance with preferred embodiments of the invention, in a filtrate separating device of the type having a receiving space for sludge to be filtered, a frame connecting a pair of walls defining the receiving space, at least one filter mat placed on a wall with a filtrate space therebetween, a sludge intake connected to the receiving space and a filtrate drain connected to the filtrate space where, for the removal of the dry filter cake, freed from filtrate, the walls are moved away from one another and frame is opened, by the features that at least one wall consists of a flexibly deformable liquid and gas impermeable material; in that the at least one filter mat is flexible and spacers are provided between each wall and filter mat that follow the movements thereof; in that a rigid frame part is associated with each wall and the frame parts of the walls are connected to one another in a sealing manner by a sealing arrangement; and in that a filtrate drain or other suction connecting piece is connected to the filtrate space between each wall and filter mat and to a vacuum pump.

The filtrate separating device according to the invention is extremely adaptable. It can be used singly or several may be joined into a sizable unit. Since this filtrate separating device operates only with a vacuum, i.e., the receiving space is compressed by the ambient pressure without an external press, it operates substantially more economically than known filtrate separating devices. The structural design of the filtrate separating device according to the invention is extraordinarily simple, and the components used are very economical. The reason is that only pressure differences of 1 bar at most are to be absorbed, for example, by the sealing arrangement, the walls and the frame parts. This again has to do with the fact that, in this case, the operation takes place only with partial vacuum. The high-pressure sealing arrangements required to be used in the filtrate separating devices known from the prior art need not be used in this case. Another advantage of the filtrate separating device according to the invention consists in the fact that, the corresponding size being assumed, it can be used even in a transportable manner. Usually, such a transportable device can have a maximum height of about 2 m or a diameter of about 2 m. A particular advantage in practice consists in the fact that the filtrate separating device according to the invention, in principle, functions in a self-sealing manner because of the use of a vacuum pump. The ambient pressure, which results in the filtering action, at the same time acts in a pressure-intensifying manner on the sealing arrangement, if the latter has been previously positioned correctly.

Further, it is important that an otherwise necessary heating of the sewage sludge is not required or is necessary only to a reduced extent to achieve a good dehydration. That is, the use of a partial vacuum leads to a lower boiling point of the water in the sewage sludge.

It is essential that the filter mats be more or less separated all-over from the walls by spacers. As a result, all-over between the filter mats and the walls there is a space, in which the partial vacuum from the vacuum pump can act. Thus, it is essential that the spacers be designed so that the filter mats are not pressed on the walls by the partial vacuum. Surprisingly, the filter mats are also not torn by the occurring pressure. The reason for this is that the filter mats are exposed, more or less, to the same pressure on the inside and outside. The outside pressure acting on the walls is compensated by the counterpressure of the filter cake. Correspondingly, the walls are "treated gently" in regard to pressure.

If it is desired to raise the pressure difference on the filter mats to improve the filtering action, excess pressure can also be applied to the walls from the outside. This changes nothing in the basic principle of the invention. Only the components then have to be designed correspondingly for the higher pressure difference.

These and further objects, features and advantages of the present invention will become apparent from the following description when taken in connection with the accompanying drawings which show, for purposes of illustration only, several embodiments in accordance with the present invention.

BRIEF DESCRIPTION OF THE DRAWINGS

FIG. 2 is the area of the sludge intake of the filtrate separating device of FIG. 1 in an enlarged representation;

FIG. 3 is the area of the filtrate drain of the filtrate separating device according to the invention, in an enlarged representation;

DETAILED DESCRIPTION OF THE PREFERRED EMBODIMENTS

Figure 1:
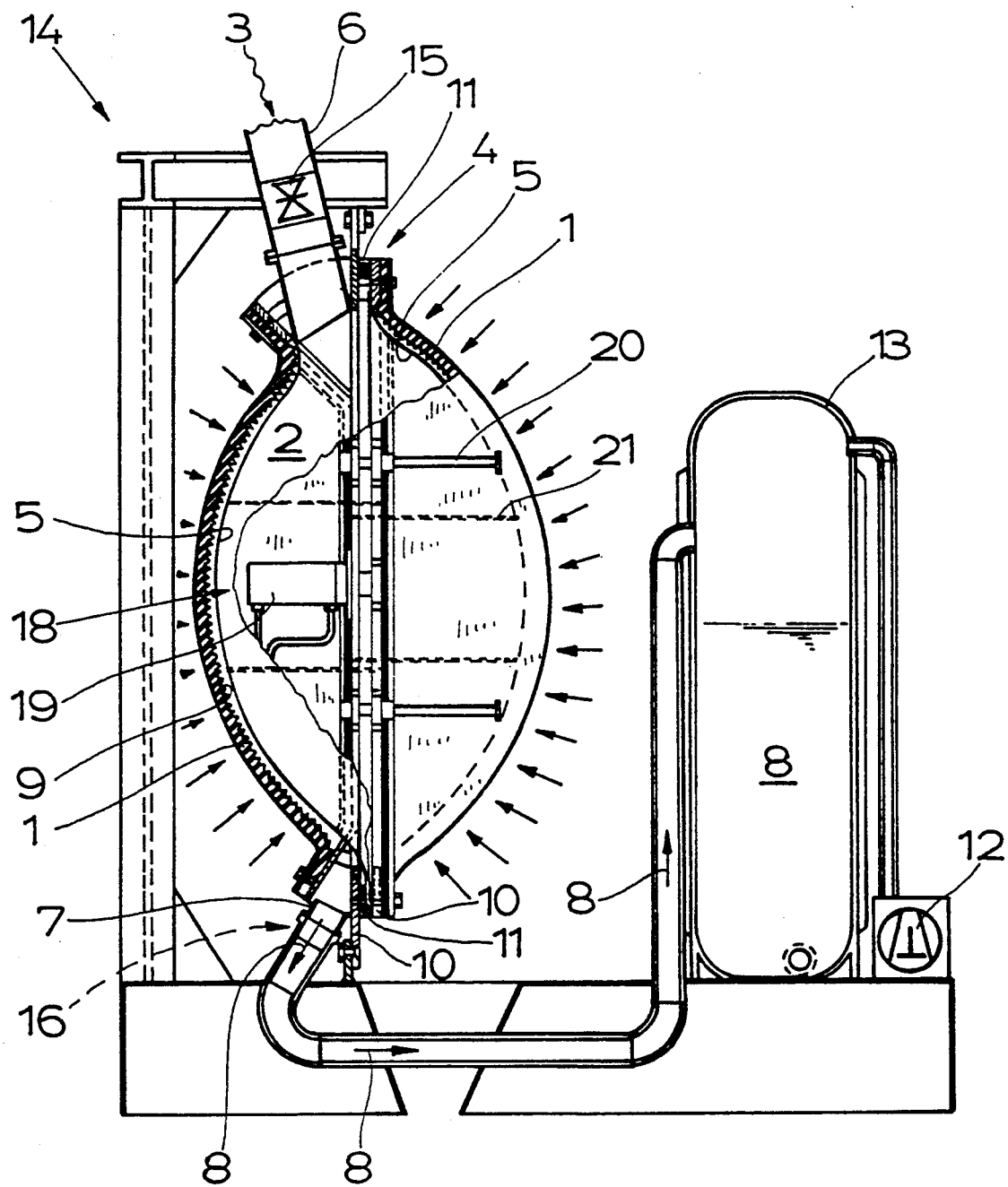
FIG. 1 is a filtrate separating device according to the invention in a general representation.

The filtrate separating device represented in FIG. 1 is particularly suitable for disposal of sewage sludge, but can also be used for other disposal projects.

The filtrate separating device has a pair of walls 1 which define a receiving space for sludge 3 to be filtered, which, in this case, is only schematically indicated. Walls 1 are sealingly connected by a frame 4. At least one filter mat 5 for solid/liquid separation is placed in receiving space 2 on at least one wall 1. A sludge intake 6 is connected to receiving space 2, while a filtrate drain 7 is connected to a filtrate space located between each wall 1 and filter mat 5. To remove the freed, dried filter cake, walls 1 can be moved away from one another, and then, at the same time, frame 4 can be opened.

To begin with, it is essential for the invention that the at least one of the walls 1 that is connected to a filter mat 5 consist of a flexibly deformable, optionally, also of limited elasticity, liquid-impermeable and gas-impermeable material. For such a material, primarily a rubber or rubber mixture, optionally with a reinforcing fiber insert or textile fabric insert is contemplated; but, also, a plastic-coated fabric would also be usable. Spacers 9 are provided between each wall 1 and the respective flexible filter mat 5. These spacers follow the movements of walls 1 and filter mats 5. Spacers 9 always keep the filter mats 5 at such a distance from walls 1 that the filtrate removed from the sewage sludge can drain between filter mats 5 and walls 1. Such spacers 9 can also have the shape of duct structures, as known in the prior art. But, with the material requirements for walls 1, more often, knob-like structures will be involved.

Further, it now essential that a rigid frame part 10 of frame 4 be allocated to each wall 1 and that the frame parts 10 be connected to one another in a sealing manner by a sealing arrangement 11. The frame parts serve for stabilizing and clamping walls 1 and filter mats 5. Basically, it would also be possible to configure one of the walls 1 so that it is not flexibly deformable, i.e., to make it as a rigid part. Then, this wall 1 would, conventionally, be solidly connected to frame part 10, if not made of one-piece with it.

For the functioning of the filtrate separating device according to the invention, it is essential that filtrate drain 7, or another suction connecting piece connected to the filtrate space between walls 1 and filter mats 5, be connected directly or indirectly to a vacuum pump 12. FIG. 1 makes clear that the connection, which in this case is applied to filtrate drain 7, is connected to vacuum pump 12 via a filtrate separator 13. This is, of course, advantageous to prevent filtrate from reaching the pump as much as possible. Filtrate separator 13, here, has the form of a filtrate collection tank.

In the represented and to this extent preferred embodiment, sludge intake 6 for sewage sludge 3 is at the top of frame 4, while filtrate drain 7 is at the bottom. The intake into receiving space 2 takes place by the dead weight of sludge 3, while filtrate 8 also flows by its dead weight toward filtrate drain 7.

In principle, the outside form and the cross-sectional shape of the filtrate separating device according to the invention can be selected to be of any kind. As is often provided in the art, it is especially suitable if the outside cross section is a circular cross section, i.e., frame 4 outwardly exhibits a basically circular cross section. Thus, in FIG. 1, it is shown that frame 4, in this case, is mounted in vertical arrangement in a supporting structure 14. This corresponds especially to the intake/drain situation, which according to preferred teaching has been described above.

It goes without saying that a vacuum can be created in receiving space 2 only if no other sludge subsequently flows through sludge intake 6 following the partial vacuum. Consequently, it is advisable to place a cutoff valve 15, preferably in the form of a gate valve, on sludge intake 6. Correspondingly, it can be advisable to provide a cutoff valve also on filtrate drain 7, if for design reasons it should be necessary.

In FIG. 1, it can be clearly seen how frame 4 in supporting structure 14 is mounted in a vertical arrangement so that sludge 3 to be filtered can flow downward into receiving space 2 through sludge intake 6 under gravity as well as following the partial vacuum produced by vacuum pump 12. Thus, in FIG. 1, left side, the representation is cut open so that the inside of receiving space 2 can be seen and corresponding wall 1, in this case is represented in section. On the right, the exterior design can be seen in the outside view of the edge of frame 4.

On wall 1, which is represented in section on the left, spacers 9 can be seen. In this case, spacers 9 are formed by a corresponding contouring of wall 1 as integral components of wall 1 that preferably is made of a rubber material.

If sludge 3 is completely filled in receiving space 2 and if cutoff valve 15 is then closed, because of the partial vacuum produced by vacuum pump 12, the volume of the filtrate separating device is reduced, i.e., walls 1 are slowly pulled toward one another. Thus, the liquid is pressed out from sludge 3, penetrates filter mats 5 and flows in the space between filter mats 5 and walls 1, which is maintained by spacers 9, into filtrate drain 7. The design is extremely simple and reliable and, thus, also very economical. It can be seen that frame 4 with frame parts 10 and sealing arrangement 11 is easily self-sealing under the action of the partial vacuum in receiving space 2. In this case, no expensive sealing measures are needed.

FIG. 1, in connection with FIGS. 2 and 3, shows further details of the filtrate separating device according to the invention. First, design measures are needed to provide a connection from sludge intake 6 into receiving space 2 to connect it with frame 4. This holds true, correspondingly, in the area of filtrate drain 7. For this purpose, according to preferred teaching, sludge intake 6, in the form of an intake connecting piece, is placed on a frame part 10 and filtrate drain 7, in the form of a drain connecting piece, is placed on the same or another frame part 10 so that frame part 10, in the area of filtrate drain 7, has the fastening area for wall 1 on one side and the fastening area for filter mat 5 on the other side of filtrate drain 7.

The design discussed above is sufficient, without further measures, if only one wall 1 consists of flexible rubber material or the like. In such a case there is only one filter mat 5 and the arrangement is easily complete with the explained measures. But, in the represented embodiment with two flexible walls 1, which represents the preferred embodiment, filtrate also occurs on the other wall 1. In this case, a transfer duct 17 has to be provided in frame 4 for filtrate 8 coming from the other wall 1 or shown in FIG. 3. Thus, FIG. 3 further makes it possible to see that, in this case, according to preferred embodiment, transfer duct 17 runs through sealing arrangement 11. This, of course, is an especially suitable measure since, by itself, an optimal sealing of transfer duct 17 is guaranteed in the transition between the two frame parts 10.

Figure 6:
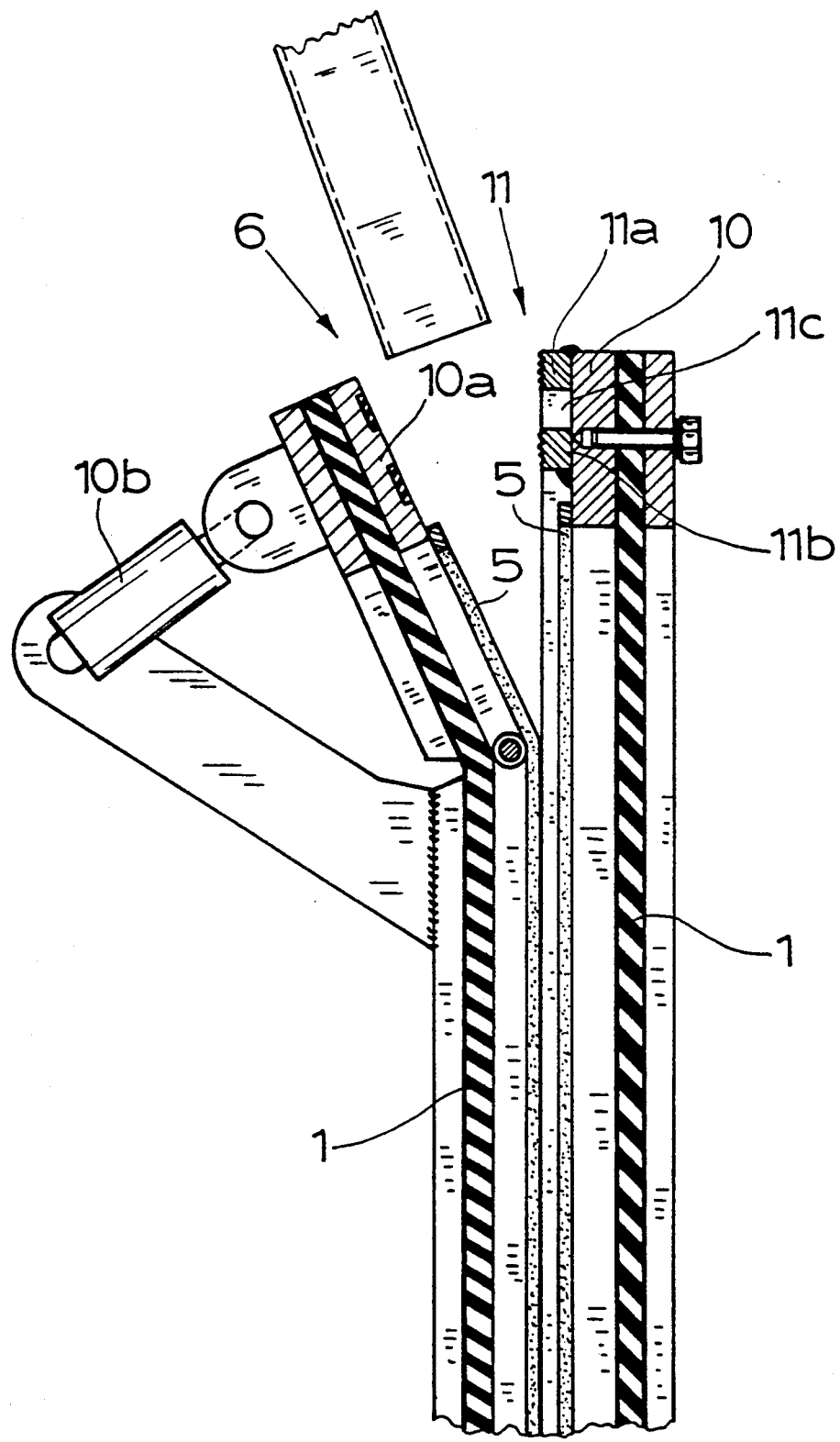
FIG. 6 is a second embodiment in a representation corresponding to FIG. 2.

In the above-explained embodiment, represented in FIG. 2, it is possibly somewhat difficult to add sludge intake 6 in the form of an intake connecting piece and in operation requires a gate valve or the like. Moreover, the wall in this area is necessarily greatly deformed. This is difficult with respect to wear. On the other hand, FIG. 6 shows an alternative solution in which, to achieve sludge intake 6, a small part 10a of frame 4 can be swung out from a totally closed condition or is otherwise movable or removable. In the represented embodiment, a piston-cylinder arrangement 10b is placed on the other frame part 10 for this purpose. FIG. 6 shows part 10a in a moved condition which forms an opening in frame 4, which serves for the intake of sludge. If receiving space 2 is filled with sludge, part 10a is swung closed and frame 4 is automatically completely closed. A gate valve can, consequently, be eliminated, so that the technical expenditure, as a whole, is not as great as that for the first embodiment.

Figure 7:
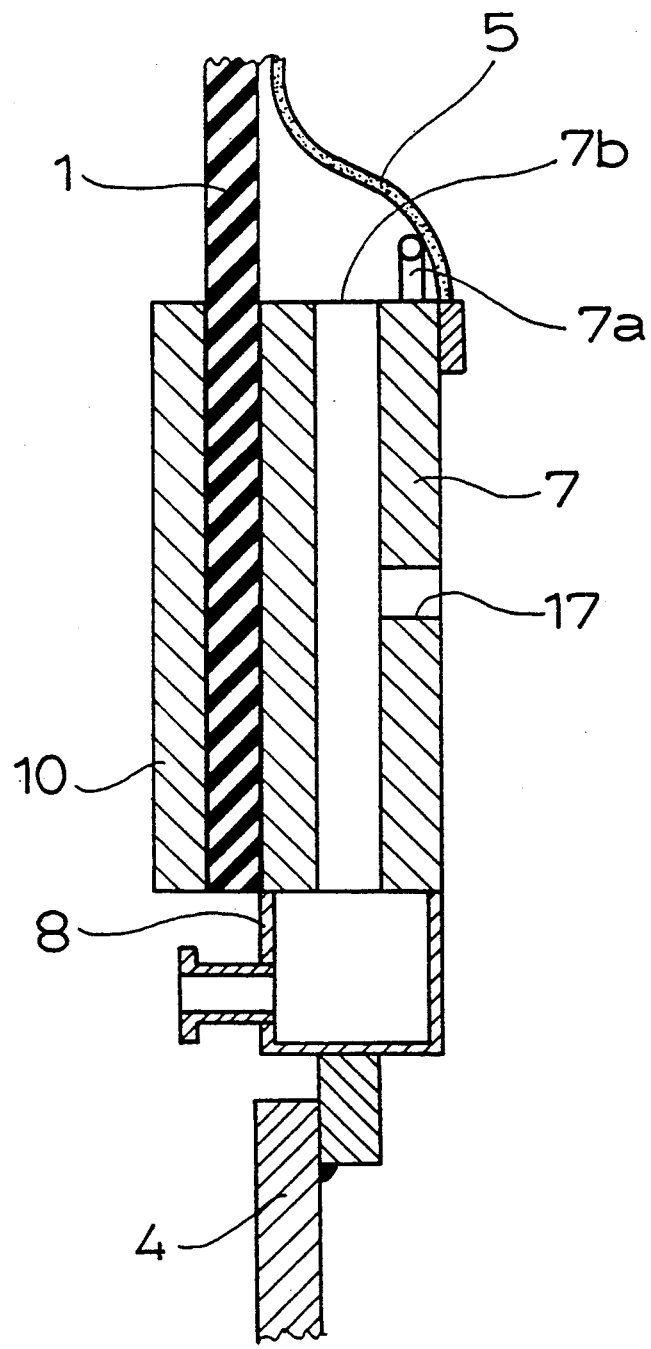
FIG. 7 is the second embodiment of FIG. 6 in a representation corresponding to FIG. 3.

FIG. 7 shows an alternative solution for filtrate drain 7. It has been recognized that a connecting piece with large cross section is not absolutely necessary for filtrate drain 7, and it suffices if filtrate drain 7 is designed as a flat plate parallel to the flange plane on frame part 10. This has the same effect as with sludge intake 6; namely, that wall 1 need not be unnecessarily sharply bent, but can be designed basically straight with only a slight bend.

In FIG. 7, a spacer 7a is provided on the plate, which forms filtrate drain 7, which prevents filter mat 5 from clogging intake 7b of the filtrate drain.

The arrangement of a transfer duct 17 for filtrate 8 coming from the other wall 1 was explained above by FIG. 3 in the first embodiment. The embodiment represented in FIG. 6 now clearly shows another sealing arrangement 11. It consists of two continuous sealing rings 11a, 11b and continuous vacuum chamber 11c formed in-between. Further, sealing rings 11a, 11b are designed as shaft or tooth sections so that, with equal surface pressure, slight overall closing forces result. Vacuum chamber 11c, formed between sealing rings 11a, 11b, has the function of a collection chamber. Also, a vacuum is very quickly formed in this vacuum chamber 11c, so that the self-sealing of frame 4 is once more substantially improved and, especially, starts considerably earlier than with a standard block seal.

In connection with transfer duct 17, the above-explained sealing arrangement has the further advantage that it can come out between sealing rings 11a, 11b in vacuum chamber 11c. This again means that transfer duct 17 need not be placed in true alignment in the two frame parts, as in the embodiment according to FIG. 3. Positional deviations are equalized by vacuum chamber 11c in its function as a collection chamber.

Up to now, only the measures in the separation of filtrate 8 from sludge 3 have been described. Now, when the separation is completed, a small-volume filter cake remains in receiving space 2. It has to be removed from receiving space 2, as, of course, is also the case in the prior art. To perform this removal, it is advisable to provide a corresponding mechanism, since, usually, it can hardly be performed manually. Thus, it is advisable, preferably, to provide an effective separating drive 18, on the outside of frame 4 between the two frame parts 10, for moving one frame part 10 relative to the other frame part 10. In this case a hydraulic, pneumatic or electric separating drive can be used. The drive, of course, also serves to bring frame parts 10 together.

In the represented and to this extent preferred embodiment, separating drive 18 has a pair of drive units 19 placed on opposite sides of the frame relative to one another, and preferably, each drive unit 19 has a pair of guide rods 20 for moving frame part 10. Drive unit 19, located on one side, with two guide rods 20 for moving frame part 10, in this case placed on the right, can be seen in FIG. 1. On the "backside" in FIG. 1, is a structurally similar drive unit 19 and both are synchronously controlled. By operation of drive units 19 of separating drive 18, thus, frame part 10, located on the right, is precisely symmetrically moved as determined, so that the filter cake located therein can fall down. For this purpose, a corresponding funnel is placed under the entire arrangement, which is indicated in FIG. 1.

It can happen that the filter cake when frame 4 is opened gets stuck in the frame on walls 1 and either tears apart or simply gets stuck in receiving space 2 near a wall 1. To separate the filter cake from walls 1 with safety, in the represented embodiment, a special measure is put into effect. That is several traction elements 21, located at a specific maximum interval, are provided in receiving space 2, and by which the filter cake can be loosened from walls 1 when frame 4 is opened. Traction elements 21 in the represented embodiment are designed as highly tear resistant nylon ropes. Thus, in this case, the indicated maximum interval is established so that two traction elements each are fastened to a frame part 10 and run into the part of receiving space 2, which is allocated to a wall 1 connected to the other frame part 10. This again is a special measure that guarantees that traction elements 21 move in opposite direction when frame 4 is opened, so that actually both sides of the filter cake are pulled from respective walls 1. If, for example, only the maximum interval of traction elements 21 from one another were set, it would be possible for the filter cake to remain stuck in one part of receiving space 2. It would then be loosened only from one of the walls. Consequently, the design represented in this case is even more suitable. It, thus, shows that it is entirely suitable if traction elements 21 run behind filter mats 5, i.e., between filter mats 5 and wall 1. They can then transmit the traction force to the filter cake distributed over filter mats 5, otherwise it would be possible that the filter cake simply breaks away under the traction force of traction elements 21.

Another preferred embodiment of the invention is not represented, which is characterized in that a ultrasonic transmitter is placed on frame 4 or in receiving space 2, which propagates ultrasonic vibrations in the sewage sludge, on filter mats 5 or in a purification water fill. The ultrasonic vibrations of such a ultrasonic transmitter support the filtering process, since filter mats 5 thus clog much less quickly with sewage sludge. Also lumps do not develop or do so very much slower. When frame 4 is opened, the filter cake is more easily loosened from walls 1 if filter mats 5 or also walls 1 always oscillate in ultrasonic vibrations. Finally, the ultrasonic transmitter also acts in a supporting manner in the internal cleaning of the filtrate separating device, if it propagates ultrasonic vibrations in a purification water fill. It has been shown that with the use of an ultrasonic transmitter chemical flocculants otherwise applied to filter mats 5 in the way under discussion are almost superfluous. With respect to filter mat 5 it is suitable if the filter cloth, itself, is elastic only in a limited manner but exhibits optimal filtering properties. However, to achieve a sufficient total elasticity for filter mat 5, it is advisable to provide the filter cloth with an elastic border, for example made of a rubber-fiber mixture or the like. The latter can be vulcanized, for example, on the fabric material of the filter cloth.

Figure 4:
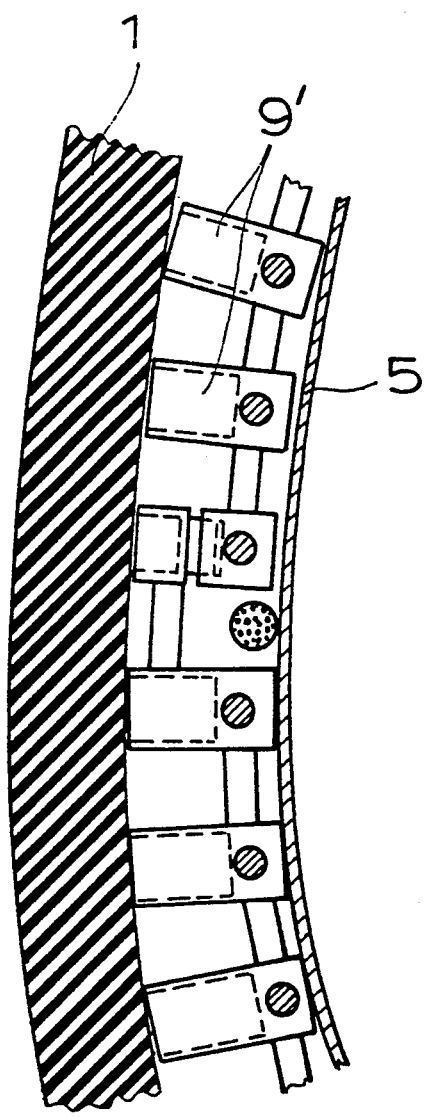
FIG. 4 is a part of the wall in a first embodiment, in a detail, in an enlarged representation.

In regard to spacers 9 some things have already been explained above. The embodiment represented in FIG. 1 shows elevations made integrally on wall 1, which serve as spacers 9. This is certainly very suitable. FIG. 4 now clearly shows that, also, a plastic-knob mat 9' could be inserted between wall 1 and filter mat 5, which has the function of spacers 9. The knob materials would have to be fastened in some way to the walls. Such knob mats are on the market and often consist of polyethylene. The knobs should, other than concretely represented, rather be somewhat rounded, so as not to damage filter mat 5. For the filter mat, it correspondingly applies that the latter can be designed as a nylon fabric filter or as plastic-filament cloth filter, for example, a polymer filter.

Figure 5:
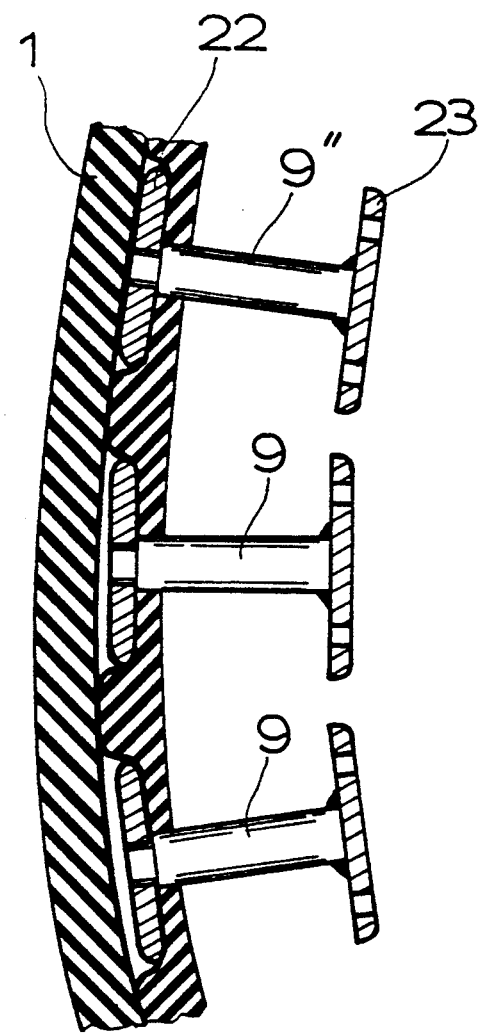
FIG. 5 is a part of the wall in a second embodiment, in a representation corresponding to FIG. 4.

FIG. 5 shows another alternative, which consists in the fact that spacers 9" are embedded, especially vulcanized in, walls 1 with fastening feet 22. Thus, the example from FIG. 5, to this extent, is special as spacers 9" have plate-like widenings 23, which form an inside surface at a distance from wall 1, and are provided with passages which enable them to serve the function of filter mat 5. Such spacers 9" can be used, for example, if the filtrate separating device has to deal with harder material than normal sludge 3. Especially, such spacers 9" can be used if the filtrate separating device is used for garbage compaction.

Generally, parallel connections can be made between filtrate separating devices of the type according to the invention in a modular manner corresponding to requirements. A filter unit, thus, can practically be expanded by stages as desired.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. Filtrate separating device comprising a pair of walls defining a receiving space for sludge to be filtered, a frame connecting and sealing said walls, at least one filter mat placed on a respective wall in the receiving space with a filtrate space being disposed therebetween, a sludge intake connected to said receiving space and a filtrate drain connected to the filtrate space between each wall and filter mat; wherein said walls are displaceable away from each other for the removal of a dry filter cake, freed from filtrate by opening of the frame; wherein at least one of the walls is formed of a flexibly deformable liquid and gas impermeable material; wherein spacers are located between each wall and filter mat in a manner enabling them to follow movements of the respective wall and filter mat; wherein said frame comprises a respective rigid frame part connected to each wall, with the frame parts being connected to one another in a sealing manner by a sealing arrangement; and wherein the filtrate drain is at least indirectly connected to a vacuum pump in a manner enabling a partial vacuum to be drawn in each filtrate space.

2. Filtrate separating device according to claim 1, wherein the sludge intake is located above and the filtrate drain is located below said receiving space.

3. Filtrate separating device according to claim 1, wherein the frame is mounted in a vertical orientation in a supporting structure.

4. Filtrate separating device according to claim 1, wherein a cutoff valve is located at the sludge intake.

5. Filtrate separating device according to claim 1, wherein a cutoff valve is located at the filtrate drain.

6. Filtrate separating device according to claim 1, wherein the sludge intake is in the form of an intake connecting piece placed on one of the frame parts and the filtrate drain is in the form of a drain connecting piece placed on either of the frame parts; and wherein the frame part with the drain connecting piece has a fastening area for one of the walls on one side of the filtrate drain and a fastening area for a respective filter mat on the other side of filtrate drain.

7. Filtrate separating device according to claim 4, wherein the sludge intake is in the form of an intake connecting piece placed on one of the frame parts and the filtrate drain is in the form of a drain connecting piece placed on either of the frame parts; and wherein the frame part with the drain connecting piece has a fastening area for one of the walls on one side of the filtrate drain and a fastening area for a respective filter mat on the other side of filtrate drain.

8. Filtrate separating device according to claim 1, wherein the sludge intake is formed by a movable section of one of the frame parts by which the frame can be opened from a totally closed condition.

9. Filtrate separating device according to claim 8, wherein the filtrate drain is formed by a flat plate disposed parallel to a flange on one of the frame parts, a fastening area for one wall being placed on one side of the plate and a fastening area for a respective filter mat on the other side of the plate.

10. Filtrate separating device according to claim 1, wherein the filtrate drain is formed by a flat plate disposed parallel to a flange on one of the frame parts, a fastening area for one wall being placed on one side of the plate and a fastening area for a respective filter mat on the other side of the plate.

11. Filtrate separating device according to claim 1, wherein a respective said filter mat is mounted on each wall, one of the filtrate spaces being connected to the filtrate drain via a transfer duct provided in the sealing arrangement of the frame parts.

12. Filtrate separating device according to claim 1, wherein the sealing arrangement comprises a pair of continuous sealing rings and a continuous vacuum chamber formed therebetween.

13. Filtrate separating device according to claim 12, wherein a respective said filter mat is mounted on each wall, one of the filtrate spaces being connected to the filtrate drain via a transfer duct provided in the sealing arrangement of the frame parts, the transfer duct opening into the vacuum chamber between sealing rings.

14. Filtrate separating device according to claim 1, wherein a separating drive is connected between the two frame parts for moving one frame part relative to the other frame part.

15. Filtrate separating device according to claim 14, wherein the separating drive has a pair of drive units, one on each of opposite sides of the frame; and wherein each drive unit has a pair of guide rods for moving the frame parts relative to each other.

16. Filtrate separating device according to claim 1, wherein a plurality of traction elements are distributed in each receiving space at a specific maximum interval by which the filter cake can be loosened from the walls when the frame is opened.

17. Filtrate separating device according to claim 1, wherein the spacers are designed as knobs integrally formed on said at least one wall.

18. Filtrate separating device according to claim 1, wherein the spacers are designed as a plastic knob mat fastened on said at least one wall.

19. Filtrate separating device according to claim 1, wherein the spacers have fastening feet that are embedded in said at least one wall.

20. Filtrate separating device according to claim 1, wherein the spacers have plate-like widenings at a distance from said at least one wall, said widenings forming an inside surface provided with passages, and said inside surface functioning as a said filter mat.

* * * * *